United States Patent [19]

Cheron et al.

[11] 4,431,235
[45] Feb. 14, 1984

[54] DECELERATION-CONTROLLED BRAKING COMPENSATOR FOR A MOTOR VEHICLE

[75] Inventors: Jean-Marc Cheron, Longperrier; Jean-Jacques Carre, Le Raincy, both of France

[73] Assignee: Societe Anonyme DBA, Paris, France

[21] Appl. No.: 355,988

[22] Filed: Mar. 8, 1982

[30] Foreign Application Priority Data

Mar. 18, 1981 [FR] France ................ 81 05399

[51] Int. Cl.³ .................. B60T 8/14; B60T 8/26; B60T 11/34
[52] U.S. Cl. ................... 303/24 C; 303/6 C; 303/24 F
[58] Field of Search ........... 303/24 A, 24 F, 24 C, 303/24 R, 6 C, 6 R, 22 R, 22 A, 84 R, 84 A; 188/349, 195

[56] References Cited

U.S. PATENT DOCUMENTS

| 2,148,769 | 2/1939 | Miller | 303/24 |
|---|---|---|---|
| 3,795,424 | 3/1974 | Lewis | 303/24 F X |

FOREIGN PATENT DOCUMENTS

| 19509 | 11/1980 | European Pat. Off. | 303/24 C |
|---|---|---|---|
| 61960 | 10/1982 | European Pat. Off. | 303/24 C |
| 2428553 | 1/1980 | France | |
| 2437962 | 4/1980 | France | |
| 2032553 | 5/1980 | United Kingdom | 303/24 A |

*Primary Examiner*—Douglas C. Butler
*Attorney, Agent, or Firm*—Paul D. Schoenle; Ken C. Decker

[57] ABSTRACT

The compensator (20) comprises a housing in which there are disposed a compensator piston (30) between an inlet chamber (38) and an outlet chamber (42), and a pilot piston (48) between the outlet chamber (42) and a pilot chamber (52), the two pistons controlling a compensator valve (46) disposed in a passage (44) connecting the inlet and outlet chambers. A pilot valve (90-92) controlled by an inertia weight (72) is mounted in a passage (82, 80, 70, 88, 84, 86) connecting the inlet chamber (38) and the pilot chamber (52). A spring (94) returns the weight (72) in the direction of opening of the pilot valve (90-92). According to the invention, the spring (94) is interposed between the compensator piston (30) and the inertia weight (72).

A compensator of this type is used in the braking systems for motor vehicles.

5 Claims, 1 Drawing Figure

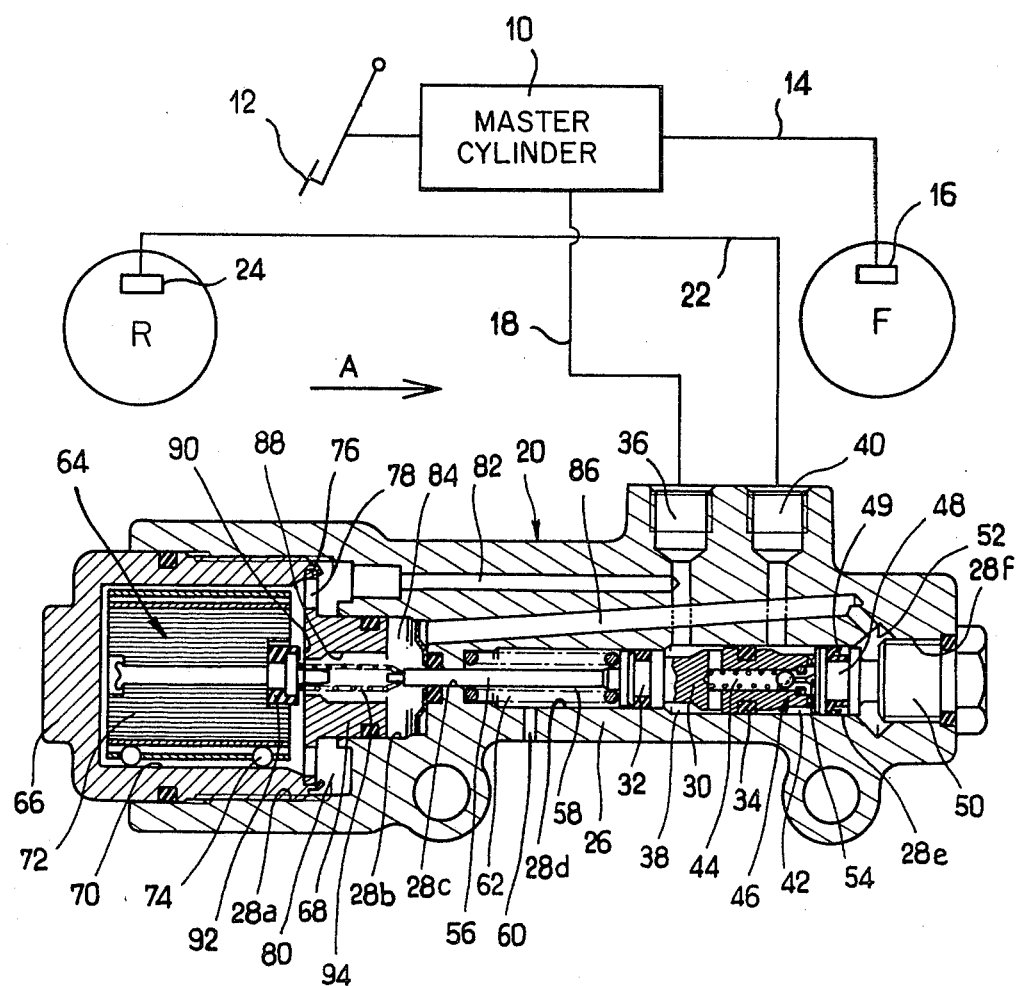

DECELERATION-CONTROLLED BRAKING COMPENSATOR FOR A MOTOR VEHICLE

The present invention relates to braking compensators for motor vehicles, of the deceleration controlled type, and more particularly a compensator of the type described in French patent application No. 78 28550 which was published under the No. 2 437 962.

The known compensator comprises a housing in which there are defined an inlet chamber, an outlet chamber and a pilot chamber, a compensator piston extending in the inlet chamber and the outlet chamber and being urged towards the latter by a compensator spring, a first passage between the inlet chamber and the outlet chamber, provided with a compensator valve controlled by said compensator piston, a pilot piston extending in the outlet chamber and the pilot chamber and also controlling said compensator valve, a second passage between the inlet chamber and the pilot chamber, provided with a pilot valve controlled by a decelerometer device, said device comprising a weight which is responsive to deceleration of the vehicle and which is returned by resilient means towards a position corresponding to opening of said pilot valve, and means responsive to the braking pressure to modify the calibration of said resilient means in dependence on said pressure.

In the compensator described in the above-mentioned application, said means comprise a plunger which is subjected to the pressure in the inlet chamber, so as to be displaced against a counter-acting spring and to modify the calibration of said resilient means in dependence on said pressure.

Briefly, it is noted that a design of this kind makes it necessary to provide two additional components, namely the plunger and the spring acting thereagainst.

In contrast, according to the present invention, a compensator of the specified type is characterised in that said resilient means are interposed between said compensator piston and said deceleration-responsive weight.

As will be appreciated from the following description, such an arrangement makes it possible to provide for a modification in the calibration of the resilient means in dependence on the braking pressure, without the addition of supplementary structure.

The invention will now be described with reference to the single FIGURE in the accompanying drawing, which is a diagrammatic view of a braking installation for a motor vehicle, comprising a braking compensator according to the invention, with the compensator being shown in longitudinal section.

As illustrated, the braking system comprises a master cylinder 10 which is operated by means of a pedal 12. A first line 14 connects the master cylinder to one or more front wheel brakes 16 of the vehicle. A second line 18 connects the master cylinder 10 to a braking compensator 20 which will be described in detail hereinafter; finally a third line 22 connects the compensator 20 to one or more rear wheel brakes 24 of the vehicle.

The braking compensator 20 comprises a housing 26 having a bore 28 formed by six successive portions indicated at 28a, 28b, 28c, 28d, 28e and 28f. The portions 28a, 28b and 28c are of progressively decreasing diameters while the portions 28c, 28d, 28e and 28f are of progressively increasing diameters.

A stepped piston 30 or compensator piston is mounted slideably and sealingly in the bore portions 28d and 28e, by way of bearing surfaces provided with seals 32 and 34. It will be noted that the housing 26 has an inlet port 36 communicating with the line 18 and opening into an inlet chamber 38 defined in the bore portion 28e, between the seals 32 and 34, and an outlet port 40 connected to the line 22 and opening into an outlet chamber 42 defined in the bore portion 28e on the other side of the seal 34. Defined in the piston 30 is a passage 44 communicating the two inlet and outlet chambers 38 and 42. In the passage 44 is mounted a ball valve 46 or compensator valve, the seat of which is carried by the piston and is disposed on the outlet chamber 42 side. A pilot piston 48 is also mounted slideably and sealingly in the bore portion 28e. The face of the pilot piston 48 which is adjacent to the compensator piston 38 forms a closure wall portion in regard to the outlet chamber 42, while the opposite face, together with a plug member 50 in the bore portion 28f, defines a pilot chamber 52. A projection 54 which is capable of lifting the ball of the valve 46 from the seat thereof, as will be described hereinafter, projects from the face of the pilot piston 48 which is towards the compensator piston 30. Sealing around the piston is provided by a lip-type seal 49.

At the end remote from the pilot piston 48, the compensator piston 30 has an extension portion 56 of small diameter, which is sealingly slideably received in the bore portion 28c. An atmospheric chamber 58 is defined in the bore portion 28d between the bore portion 28c and the seal 32, and is connected to atmosphere by a passage 60. The chamber 58 houses a spring 62, the purpose of which is to urge the compensator piston 30 towards the pilot piston 48 into a rest position in which the compensator piston 30 bears against the pilot piston 48 and the pilot piston bears against the plug member 50. It will be noted that, in the above-defined position, the projection 54 on the pilot piston 48 holds the ball valve 46 in its open position.

A decelerometer device 64 is mounted in the bore portions 28a and 28b, in the following manner:

A hollow member 66 is mounted sealingly in the bore portion 28a, and has a projection 68 which is mounted sealingly in the bore portion 28b. Defined within the member 66 is a cylindrical cavity 70 in which an inertia weight 72 is mounted slideably by means of caged ball bearing assemblies 74 which are preferably disposed on three generatrices which are displaced at 120° relative to each other. The projection 68 has a radial flange 76 which is fixed to the member 66 proper, for example as illustrated, by crimping. The flange 76 has openings 78 providing a communication between the cavity 70 and a volume 80 defined between the member 66, the bore portion 28a and the projection 68. The volume 80 is in communication with the inlet port 36 by way of a passage 82. In this way, the cavity 70 communicates directly with the inlet chamber 38. Moreover, the volume 84 defined between the projection 68, the bore portion 28b and the extension portion 56 on the compensator piston is connected to the pilot chamber 52 by a passage 86. In this way, the volume 84 and the pilot chamber 52 form a single entity which it will be appropriate to refer to hereinafter as the pilot chamber.

Provided in the projection 68 is a passage 88, between the cavity 70 and the volume 84. The passage 88 terminates at the end towards the cavity 70 with a valve seat 90 and the inertia weight 72 carries a valve closure member 92 which is disposed facing the valve seat 90.

The assembly comprising the seat 90 and the valve closure member 92 will be referred to as the pilot valve. Finally, a control spring 94 is interposed between the end of the extension portion 56 of the compensator piston 30, and the inertia weight 72.

The compensator 20 is mounted horizontally on the vehicle, in the manner shown in the drawing, that is to say, with the plug member 50 directed forwardly of the vehicle, as indicated symbolically by the arrow A. In the rest condition, all the components of the compensator are in the positions in which they are shown in the drawing, the spring 62 urging the compensator piston 30 into a position of bearing against the pilot piston 48, with the pilot piston 48 bearing against the plug member 50, the ball valve 46 accordingly being in an open condition and providing a communication between the inlet and outlets ports 36 and 40. At the other end, the spring 94 urges the inertia weight into a position of bearing against the end portion of the member 66, in which position the valve closure member 92 is moved away from its seat 90, thus ensuring communication between the inlet chamber 38 and the pilot chamber 52 by way of passage 82, volume 80, openings 78, cavity 70, passage 88, volume 84 and finally passage 86.

The above-described compensator operates in the following manner:

When braking is applied by depression of the pedal 12, the master cylinder 10 supplies fluid under pressure on the one hand in the line 14 in order to actuate the front brakes 16 of the vehicle and on the other hand, in the line 18, to actuate the rear wheel brakes 24 of the vehicle. The pressure fluid passing into the compensator 20 by way of the inlet port 36 is transmitted on the one hand to the inlet chamber 38 and on the other hand to the cavity 70 of the decelerometer device. As the valve 46 is in an open condition, there is a free communication between the inlet chamber and the outlet chamber 42, by way of the passage 44 in the piston 30. In this situation, the compensator 20 delivers, at its outlet port 40, fluid under an outlet pressure equal to the inlet pressure, and that fluid is carried by the line 22 to the rear wheel brakes 24.

In a first phase, as long as the force applied by the inlet pressure to the surface of the seal 32 remains lower than the calibration force of the spring 62, the compensator piston 30 and the pilot piston 48 remain stationary, the ball valve 46 remains open and the outlet pressure obtaining at the port 40 remains equal to the inlet pressure obtaining at the inlet port 36.

In a second phase, when the level of the inlet pressure has reached a threshold sufficient to permit the compensator piston 30 to be moved against the force of the spring 62, it is noted that the movement of the piston 30 causes closure of the ball valve 46 and that the increase in the pressure obtaining in the outlet chamber 42 is momentarily stopped. In this situation, the pilot piston 48, insofar as the decelerometer device 64 has not yet operated, as will be described hereinafter, is subjected to a pressure differential which urges it towards the piston 30, this causing re-opening of the valve 46 and re-establishing equality as between the outlet pressure at the port 40 and the inlet pressure at the port 36. It is noted that, during the second phase, the valve 46 is constantly in an equilibrium condition, at the limit of the closure position. Obviously equality between the inlet and outlet pressures is maintained as long as the decelerometer device 64 has not yet operated.

In fact, when the vehicle is braking, the vehicle is subjected to a deceleration effect and the inertia weight 72 is subjected to an inertia force directed in the direction indicated by arrow A. As long as that force remains lower than the return force applied by the spring 94, the inertia weight remains stationary and the valve closure member 92 remains lifted from its seat 90. In contrast, when the inertia force exceeds the force of the spring 94, the inertia weight is displaced so as to move the closure member 92 of the pilot valve into contact with its seat 90.

When that happens, a given volume of liquid is trapped in the volume 84, the passage 86 and the pilot chamber 52. Accordingly, the pilot piston 48 is no longer capable of moving in the direction of the compensator piston 30, and any further increase in the inlet pressure at the port 36 causes displacement of the compensator piston towards the pilot piston, thereby causing the ball valve 46 to re-open. This re-opening action of the valve 46 permits a small amount of fluid to be admitted to the outlet chamber 42, thereby resulting in an increase in the outlet pressure which pushes the piston 30 back until the valve 46 is closed. However, taking account of the various surface areas of the piston 30, which are subjected to the various pressures obtaining, the increase in outlet pressure is less than the increase in inlet pressure. As from that moment the third phase of operation of the compensator begins, during which the outlet pressure increases less than the increase in the inlet pressure, by a process of successive opening and closing movements of the valve 46.

If reference is now made to operation of the decelerometer device 64, it will be noted that the amount of deceleration required to cause closure of the valve member 92, which is fixed by the force of the spring 94, is directly proportionally dependent on the braking pressure. In fact, the movement of the compensator piston 30 in the direction of the atmospheric chamber 58 is directly proportional to the inlet pressure at the port 36. Consequently, the spring 94 which is trapped between the extension portion 56 of the piston and the inertia weight 72 applies to the latter a return force which varies proportionally with the inlet pressure.

In this way, the deceleration required to cause closure of the valve 92 and trigger the third phase of operation of the compensator, that is to say, the phase in which the outlet pressure can increase only by an amount which is proportionally less than the increase in the inlet pressure, is itself proportional to the inlet pressure. Accordingly, triggering of the third phase of operation of the compensator will always take place as from an optimum pressure, taking into account the state of load of the vehicle. In this respect, reference may advantageously be made to above-mentioned French patent application No. 2 437 962.

It will be noted that utilising the movement of the compensator piston 30 to modify the force of the spring 94, in accordance with the invention, provides a substantial simplification in comparison with the system known from the above-mentioned patent application.

In accordance with a further feature of the invention, the member 66 of the decelerometer device 64 is fixed to the housing 26 of the compensator by a screw-threaded connection; this arrangement makes it possible easily to vary the calibration of the spring 94, under a no-load condition.

In an alternative form (not shown) of the invention, the spring for return movement of the inertia weight can be engaged by a mechanical return system which is itself actuated by the compensator piston. Such an alternative embodiment will provide for example a compact construction in which the compensator piston and the inertia weight are disposed in parallel instead of being arranged in alignment, as described hereinbefore.

Finally, it will be appropriate to describe operation of the compensator 20 when the braking pressure is released.

In a first phase, the drop in pressure in the inlet chamber 38 causes return movement of the piston 30 towards the inlet chamber, and a corresponding drop in pressure in the outlet chamber 42 and in the pilot chamber 52. When the outlet pressure has again become equal to the inlet pressure, or even higher if the drop in pressure at the inlet is rapid, the ball 46 of the compensator valve lifts away from its seat to permit direct return of the fluid from the outlet chamber to the inlet chamber by way of the passage 44. In the meantime, as the level of deceleration of the vehicle has fallen, the pilot valve 90–92 which is subjected to equal pressures on respective sides is then returned to an open condition by the spring 94, causing the fluid to escape from the pilot chamber 52 to the inlet port 36. In this situation, it will be noted that the lip-type seal 49 on the pilot piston 48 lifts away from the surface of the bore portion 28c to provide a preferential path of flow for the fluid returning from the rear brake cylinders 24 to the inlet port 36 by way of the pilot chamber 52, the passage 86, the volume 84, the passage 88, the cavity 70, the volume 80 and the passage 82. Use is made of this particular characteristic to provide for automatic bleeding of the compensator of air bubbles which may be trapped therein when the system is filled, without the need to provide the compensator with a bleed screw for that purpose. In addition, the jet of liquid issuing from the passage 88 towards the cavity 70, being directed towards the inertia weight 72, permits the inertia weight to be pushed back, and makes it possible to confirm opening of the pilot valve 90, 92.

We claim:

1. A braking compensator for a motor vehicle, of the deceleration-responsive type, comprising a housing in which there are defined an inlet chamber, an outlet chamber and a pilot chamber, a compensator piston extending in the inlet chamber and the outlet chamber and urged in the direction towards the outlet chamber by a compensator spring, a first fluid flow passage between the inlet chamber and the outlet chamber, provided with a compensator valve controlled by said compensator piston, a pilot piston extending in the outlet chamber and the pilot chamber and also controlling said compensator valve, a second fluid flow passage between the inlet chamber and the pilot chamber, provided with a pilot valve controlled by a decelerometer device, said decelerometer device comprising a weight which is responsive to deceleration of the vehicle and which is biased by resilient means towards a position corresponding to the open condition of said pilot valve, and means responsive to the applied braking pressure for modifying the calibration of said resilient means in dependence on said pressure, characterized in that said resilient means are operatively interposed between said compensator piston and said deceleration-responsive weight, whereby the calibration of said resilient means is varied in direct response to the operation of said compensator piston.

2. A braking compensator according to claim 1 characterised in that said pilot piston is provided with a lip-type seal permitting a free flow of fluid from said outlet chamber towards said pilot chamber.

3. A braking compensator for a motor vehicle, of the deceleration-controlled type, comprising a housing in which there are defined an inlet chamber, an outlet chamber and a pilot chamber, a compensator piston extending in the inlet chamber and the outlet chamber and urged towards the outlet chamber by a compensator spring, a first passage between the inlet chamber and the outlet chamber, provided with a compensator valve controlled by said compensator piston, a pilot piston extending in the outlet chamber and the pilot chamber and also controlling said compensator valve, a second passage between the inlet chamber and the pilot chamber, provided with a pilot valve controlled by a decelerometer device, said device comprising a weight which is responsive to deceleration of the vehicle and which is returned by resilient means towards a position corresponding to the open condition of said pilot valve, and means responsive to the braking pressure for modifying the calibration of said resilient means in dependence on said pressure, characterized in that said resilient means are interposed between said compensator piston and said deceleration-responsive weight, said deceleration-responsive weight and said compensator piston are disposed in line and said resilient means comprise a spring bearing on the one hand against said weight and on the other hand against an extension portion of said compensator piston.

4. A braking compensator according to claim 3 characterised in that said weight and said pilot valve are disposed in a member mounted in said housing and axially movable with respect to said compensator piston.

5. A braking compensator according to either one of claims 3 or 4 characterised in that said housing has a single stepped bore in which said inertia weight, said compensator piston and said pilot piston are received.

* * * * *